United States Patent [19]

Gansauge et al.

[11] 4,176,710

[45] Dec. 4, 1979

[54] FLUIDIZED BED REACTOR

[75] Inventors: Jost Gansauge, Burghausen; Johann Muschi, Munich; Hans Freudlsperger, Neuötting, all of Fed. Rep. of Germany

[73] Assignee: Wacker-Chemie GmbH, Munich, Fed. Rep. of Germany

[21] Appl. No.: 874,185

[22] Filed: Feb. 1, 1978

[30] Foreign Application Priority Data

Feb. 7, 1977 [DE] Fed. Rep. of Germany ....... 2704975

[51] Int. Cl.² ............................................. F28C 3/16
[52] U.S. Cl. ................................ 165/104 F; 122/4 D; 165/142; 165/169; 422/146
[58] Field of Search ................... 165/104 F, 142, 169; 122/4 D; 110/245; 422/146

[56] References Cited

U.S. PATENT DOCUMENTS

| 1,761,035 | 6/1930 | Gover ................................. 165/142 |
| 2,585,274 | 2/1952 | Reichl .......................... 165/104 F X |
| 3,243,282 | 3/1966 | McGeer .......................... 422/146 X |
| 3,264,751 | 8/1966 | McEntee, Jr. ............... 165/104 F X |
| 3,890,935 | 6/1975 | Moss et al. .......................... 122/4 D |

FOREIGN PATENT DOCUMENTS

| 710072 | 9/1941 | Fed. Rep. of Germany ........... 165/169 |
| 846573 | 6/1939 | France ..................................... 165/142 |
| 148551 | 4/1952 | Sweden ............................... 165/104 F |

Primary Examiner—Albert W. Davis, Jr.

[57] ABSTRACT

A fluidized bed reactor containing a heat exchange apparatus for conveying a heat transfer medium comprising at least one pipe which extends in a vertical direction from the top of the reaction chamber into the fluidized bed with one end of the vertical pipe which points in the direction of the gas flow having a conical tapered end and/or a jacket on the outside of the reactor wall in the form of a serpentine conduit having a rectangular cross section and a domed cover.

7 Claims, 5 Drawing Figures

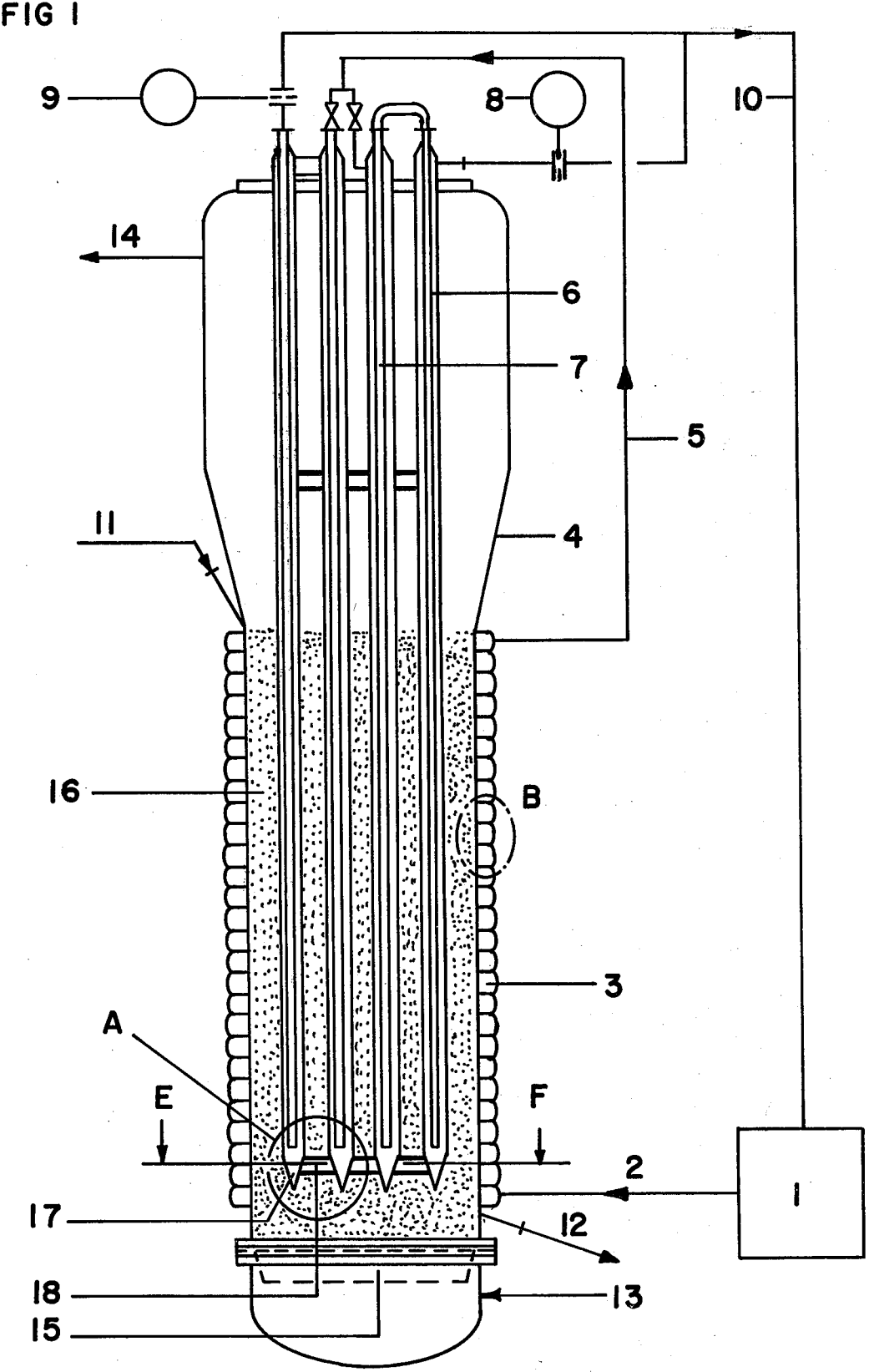

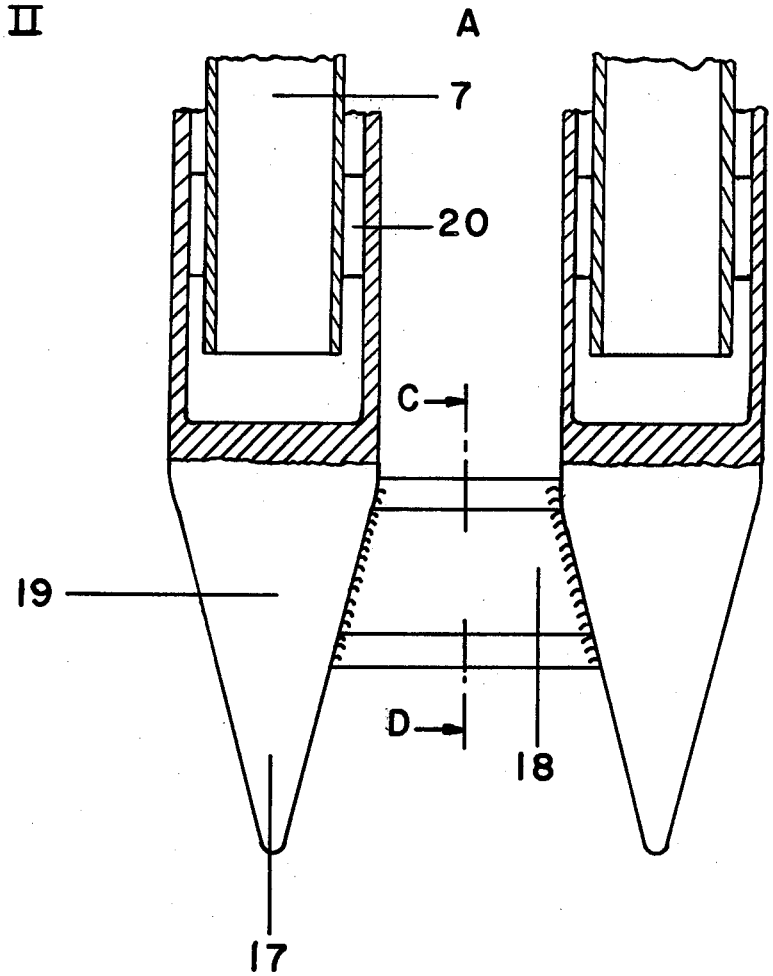
FIG II
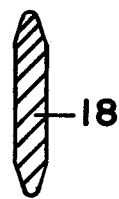
FIG III
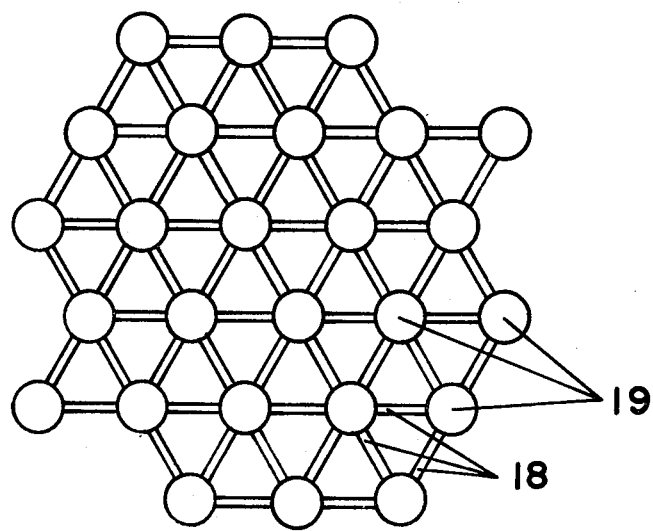
FIG V
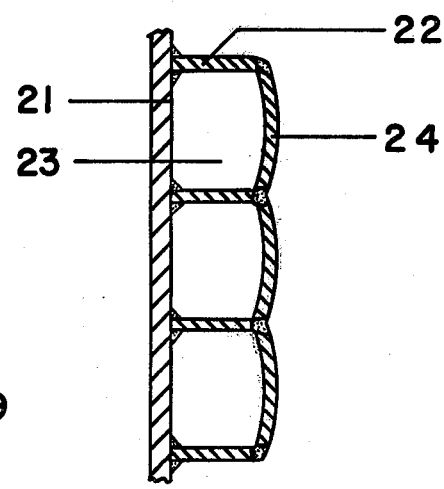
FIG IV

FLUIDIZED BED REACTOR

The present invention relates to a fluidized bed rector and more particularly to a fluidized bed reactor containing a heat exchange apparatus for conducting gas/solid reactions.

BACKGROUND OF THE INVENTION

Heretofore, it has been known that exothermic gas/solid reactions can be carried out in fluidized bed reactors. Such reactors have proven to be highly successful, especially in the preparation of silicon-halogen compounds by the so-called direct synthesis methods, where silicon containing contact masses are reacted with organic halides. The heat of reaction is dissipated through the wall of the reactor with the aid of a heat transfer medium. Also, the same medium is used to convey the heat required to initiate the reaction. (See W. Noll "Chemie und Technologie der Silicone", 1968, Pages 32 and 33).

However, dissipation of the heat of reaction through the reactor wall is not entirely satisfactory and numerous suggestions have been made to improve the process. For example, it has been suggested that heat exchanger conduits be placed inside the reaction chamber (See U.S. Pat. No. 3,133,109). It is generally believed that such conduits should criss-cross in a horizontal direction in order not to adversely affect the distribution of the gas in the fluidized bed. (See "Ullmanns Encyklopadie der technischen Chemie", 4th Edition, 1973, Volume 3, page 486). Because of the abrasion encountered in fluidized bed reactors, especially when very abrasive solid particles such as silica-containing contact masses are employed, the parameters governing the exchanger elements which protrude into the fluidized bed are very limited. For example, tubular heat exchangers having a conventional configuration have proven to be unsatisfactory, since the conduit sections which are arranged in a horizontal position in the fluidized bed with respect to the gas flow are subject to considerable abrasion and any rupturing of the conduits will contaminate the fluidized bed with the heat transfer medium. Up to the present time the problem of removing the heat of reaction through the wall of the reactor has not been solved using the conventional cooling and/or heating jackets. Even those jackets containing semi-circular pipes surrounding the reaction vessel in a serpentine configuration or those consisting of welded-on conduits having angular profiles have not solved the problem, because the heat exchange surface so created is inadequate or the latter cannot be enlarged to the extent necessary because of the additional stress placed on the material used. Thus, it is apparent that a heat exhange apparatus which is more efficient and more resistant to abrasion would be highly desirable for fluidized bed reactors for conducting gas/solid reactions.

Therefore it is an object of this invention to provide a fluidized bed reactor which can be used for gas/solid reactions. Another object of this invention is to provide a fluidized bed reactor which is more efficient in removing the heat evolved from gas/solid reactions. Still another object of this invention is to provide a fluidized bed reactor containing a heat exchange apparatus that is more resistant to abrasion. A further object of this invention is to provide a fluidized bed reactor containing at least one pipe in the reaction chamber and/or a jacket on the outside of the reactor for conveying a heat transfer medium.

SUMMARY OF THE INVENTION

The foregoing objects and others which will become apparent from the following description are accomplished in accordance with this invention, generally speaking by providing a fluidized bed reactor containing at least one pipe which is immersed in the fluidized bed in which the end, facing against the direction of the gas flow, has a conical restriction and/or a jacket on the outside of the reactor wall which forms a serpentine conduit having a rectangular cross section and is dome-shaped towards the outer wall.

DETAILED DESCRIPTION

The fluidized bed reactor of this invention thus may contain a heat exchange apparatus which consists either of at least one pipe having the aforementioned configuration in the reaction chamber or only a jacket having the aforementioned configuration on the outside of the reactor's wall, or a combination of at least one pipe on the inside of the reaction chamber and a jacket on the outside wall of the reaction chamber. A fluidized bed reactor containing at least one pipe on the inside of the reaction chamber and the jacket having the above described configuration has proven particularly effective.

It is preferred that the inside of the conically tapered section of the pipe or pipes be solid so that it does not constitute a connection with the heat transfer medium. It is preferred that the outside of the conically tapered section have a rounded point; however it may for example be in the form of a cone, a hemisphere or truncated cone. However, it is essential that this element which comes in contact with the fluidized bed offer the least amount of resistance to the gas flow and that it effectively protects the pipe against excessive wear due to friction.

When the heat exchange device consists of several pipes, the latter should be connected, preferably by means of connectors between the conical tapered sections. These connectors should offer the lowest possible resistance to the gas flow; therefore, it is preferred that they have the shape of flat plates which are arranged vertically in the reaction chamber and whose narrow sides are connected to the conical tapered elements. It has been found that vertically arranged flat material whose narrow side is welded to the conically tapered elements is best suited for this purpose.

The pipes are generally immersion pipes through which the heat transfer medium is conveyed with an alternating direction of flow. The thickness of the pipes, i.e. their outside diameter, the number of pipes and the distance between the individual pipes depends on the diameter of the reactor and the cooling surface required by the reactor's contents. The distance between the rounded points of the pipes from the flow bottom depends on the desired cooling area relative to the contents of the reactor.

When a jacket is used to convey the heat transfer medium, it is preferred that the serpentine conduit thus formed consist of a metal strip whose narrow side is welded onto the reactor wall. Towards the outside, the resulting rectangular structure is dome-shaped. The lengths of the edges of the so formed channel are determined by the width of the metal strips and the distance between the metal strips on the reactor wall. It is preferred that the lengthwise edge be welded vertically on the reactor wall, so that the serpentine conduit has a rectangular cross section.

Towards the outside the channel should be sealed by a welded-on metal strip which forms a convex dome. However the dome formed by the metal strip may also be concave or ribbed.

The combination of a square cross section and the domed outside cover essentially eliminates excessively high stresses in the serpentine conduits caused by contraction strains. These conduits respond to existing requirements far better than the serpentine conduits known heretofore having a square cross section.

Moreover, the heat exchange apparatus of this invention avoids undesirable stresses which are present when angled profiles are welded to a reactor wall, since the material has already undergone considerable deformation. Compared to conventional welded-on semi-circular pipes having semi-circular cross sections, the heat exchange apparatus of the invention has the added advantage that it can be manufactured in any desired size, whereas it is very difficult to manufacture semi-circular pipes having a large diameter. Another advantage is that with the configuration of the heat exchange apparatus of this invention all of the reactor wall which participates in the heat exchange becomes available for the transfer of heat, whereas when hemispherical pipes are welded next to each other on the reactor wall, the area which is in contact with the heat transfer medium is considerably smaller than the reactor wall which participates in the heat exchange.

The following diagrams illustrate an embodiment of this invention, in which a heat exchange apparatus which has proven to be especially effective is described in detail.

FIG. I illustrates a longitudinal section of a fluidized bed reactor containing a plurality of pipes in the reaction chamber and a jacket mounted on the outside of the reactor wall, as well as the apparatus for circulating the heat exchange medium.

FIG. II is a part-section of the conically shaped elements having connecting channels as illustrated at A of FIG. I.

FIG. III is a longitudinal section of the cross-members as taken at line C–D of FIG. II.

FIG. IV is a longitudinal section of the serpentine conduits in B of FIG. I.

FIG. V is a cross sectional view of the pipes in the reaction chamber taken at line E–F of FIG. I.

As can be seen in FIG. I, the heat exchange medium is transferred from the heating and/or cooling equipment (1) through conduit (2) into jacket (3) of the fluidized bed reactor (4) and subsequently through conduit (5) into the pipes of the pipe assembly (6) which in order to achieve a definitive direction of flow is equipped with immersion pipes (7). The outlet pipes of the pipe assembly (6) are connected to flow indicators (8) and (9) in order to assure that the individual section of the pipe assembly (6) are uniformly supplied. The heat exchange medium is recirculated to the heating and/or cooling equipment (1) through conduit (10).

The fluidized bed reactor (4) is equipped with an inlet (11) and outlet (12) for the solid materials, gas inlet (13), gas outlet (14) and distributor plate (15) for the distribution of the gas.

The pipes of the pipe assembly (6) extend vertically from the top of the fluidized bed reactor (4) into the fluidized bed (16) and contain conically tapered lower ends (17) on the outside which point in the direction of the gas flow. The latter are interconnected by means of connectors (18).

The jacket (3) which covers all of the outside surface of the reactor wall which on its inside contains the fluidized bed (16) shows the serpentine conduit in the form of superposed cross sections.

FIG. II illustrates the bottom ends of two pipes of the pipe assembly (6) in accordance with section A of FIG. I. The points (17) which are rounded towards the outside, are made of solid material (19). The heat transfer medium is conveyed through immersion pipes (7) which are centered by means of guide members (20). Connector (18) consists of a vertically arranged flat material whose narrow side is laterally welded onto the points (17) of pipes (6).

FIG. III illustrates a cross sectional area of connector (18) along lines C–D of FIG. II.

FIG. IV illustrates an enlargement of jacket (3) at section B of FIG. I. The jacket is formed by a sheet metal strip (22) which is lengthwise and welded rightangled onto the reactor wall (21). It has a rectangular cross section (23) and towards the outside it is covered by a domed sheet metal strip (24) which is welded thereon.

FIG. V illustrates a cross sectional view taken on line E–F of FIG. I through the bottom ends of the solid pipes (19) and the connectors (18) of the pipe assembly (6) in fluidized bed reactor (4).

The heat exchange apparatus of this invention containing pipes and/or a jacket provides for the construction of heat exchange apparatus of any desired size, since the pipes placed inside the reaction chamber are substantially free of abrasion due to the vigorous movement of the fluidized bed. Moreover since the jacket material is practically devoid of destructive mechanical stresses, the dimensions of the heat exchange surfaces are no longer limited. Therefore, it is now possible to achieve a considerably increase in the output of the fluidized bed which is dependent on the size of the available heat exchange surface.

Although specific embodiments of the invention have been described herein, it is not intended to limit the invention solely thereto, but to include all variations and modifications falling within the spirit and scope of the appended claims.

What is claimed is:

1. A fluidized bed reactor for the preparation of silicon-halogen compounds from the reaction of a silicon containing contact mass with organic halides, said fluidized bed reactor containing a heat exchange apparatus for conveying a heat transfer medium, said heat exchange apparatus having at least one pipe which is suspended vertically from the top of said reactor into the fluidized bed, said pipe having a conically tapered configuration at its end which is opposite to the direction of gas flow in which the inside of said conically tapered section of the pipe is solid, a jacket on the outside wall of said fluidized bed reactor which forms a serpentine conduit having a rectangular cross section which is enclosed on its outer most surface with a cover having a dome-shaped configuration, said jacket is connected to the pipe so that the heat transfer medium is conveyed through said jacket into said pipe.

2. The fluidized bed reactor of claim 1, wherein the outside surface of the conically tapered section of the pipe has a rounded point.

3. The fluidized bed reactor of claim 1, wherein the reaction chamber has more than one pipe suspended vertically from the top of the reactor into the fluidized bed with the conically tapered sections of said pipes being interconnected by connectors.

4. The fluidized bed reactor of claim 3, wherein the connectors consist of flat plates which stand vertically in the reaction chamber and whose narrow sides are connected with the conically tapered sections.

5. The fluidized bed reactor of claim 1 wherein the rectangular conduit is formed by a metal strip whose lengthwise edge is welded in the form of a spiral onto the reactor wall and its outer most surface is enclosed by a dome-shaped metal strip.

6. The fluidized bed reactor of claim 5, wherein the rectangular conduit which is formed by a metal strip whose lengthwise edge is welded at right angles onto the reactor wall in the form of a spiral and is enclosed on its outer most surface with a dome-shaped metal strip.

7. The fluidized bed reactor of claim 5, wherein the outside of the conduit is closed by a welded-on metal strip having a convex dome.

* * * * *